G. ROYAN.
DOUGH MIXER.
APPLICATION FILED JULY 18, 1921.

1,408,473.

Patented Mar. 7, 1922.

Inventor:
George Royan
By: Fisher Towle Clapp & Soans
Attys.

UNITED STATES PATENT OFFICE.

GEORGE ROYAN, OF CHICAGO, ILLINOIS, ASSIGNOR TO AMERICAN OVEN & MACHINE COMPANY, OF CHICAGO, ILLINOIS, A CORPORATION.

DOUGH MIXER.

1,408,473.   Specification of Letters Patent.   Patented Mar. 7, 1922.

Application filed July 18, 1921. Serial No. 485,585.

*To all whom it may concern:*

Be it known that I, GEORGE ROYAN, a citizen of the United States, and a resident of Chicago, in the county of Cook and State of Illinois, have invented certain new and useful Improvements in Dough Mixers, of which I do declare the following to be a full, clear, and exact description, reference being had to the accompanying drawing, forming a part of this specification.

The present invention has relation to that class of dough mixers in which there is provided a revoluble mixing arm of a construction adapted to shift the mass of dough back and forth, first toward one end of the interior of the vessel or casing and then towards the opposite end.

The object of the invention is to so improve the mixing arm that a more effective mixing and stretching of the dough may be accomplished. To this end, the invention consists in the features of novel construction hereinafter described, illustrated in the accompanying drawing and particularly pointed out in the claims at the end of this specification.

Figure 1:
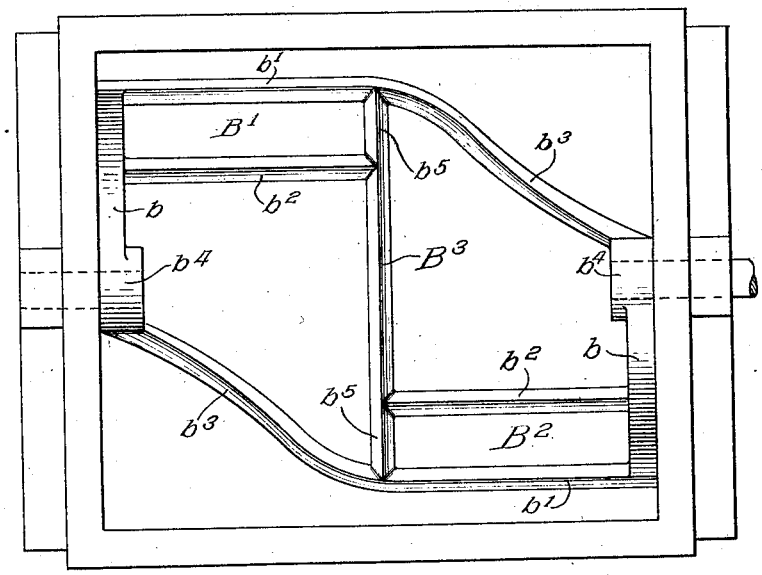
Figure 2:
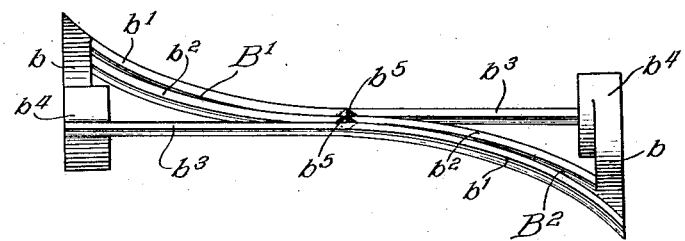

Figure 1 is a plan view showing a dough mixing machine embodying my invention. Figure 2 is a detail view of the mixing arm.

A designates the inclosing casing the construction of which may be similar to that set forth in Letters Patent No. 831,372, dated September 18, 1906. The end walls of this casing are provided with suitable bearings to receive the stub shafts projecting outwardly through the casing from the mixing arm B. One of the stub shafts of the mixing arm will have connected thereto suitable means whereby revolution may be imparted to the arm, but as the means for revolving the arm forms no part of the present invention, I have not deemed it necessary to illustrate or describe the same.

My improved mixing arm B is provided upon opposite sides of its axis with members B' and B² reversely inclined and adapted to move the dough back and forth from end to end of the casing as the mixing arm is revolved. As shown, the mixing arm comprises end bars $b$ adapted to travel in proximity to the end walls of the casing A and the members of the mixing arm at opposite sides of its axis are preferably formed of general quadrilateral shape; that is to say, from the end bars $b$ project inwardly the bars $b'$ and $b^2$ and from the bars $b'$ extend the curved bars $b^3$ which connect the bars $b'$ with the hubs $b^4$ of the mixing arm, the bars $b$ and $b'$ being connected by the bars $b^5$. Between the oppositely disposed members of the mixing arm, and at right angles to the axis of the arm, extends the stretching bar B³, the function of which will be presently stated.

By reference more particularly to Fig. 2 of the drawings, it will be seen that the members B' and B² of the mixing arm are inclined or curved in opposite directions. As shown, the bars $b^3$ extend in line with the vertical plane through the axis of the mixing arm (Fig. 2), while the bars $b$ project obliquely with respect to such plane and the bars $b'$ and $b^2$ are preferably curved from the bars $b$ to the stretching bar B³. The effect of thus reversely inclining the members of the mixing arm is to cause the massed dough to be moved back and forth from end to end of the mixing chamber as the mixing arm is revolved.

The purpose of providing the mixing arm with the transverse stretching bar B³ is to stretch and turn the mass of dough as it moves back and forth from end to end of the mixing chamber, thus varying the action of the members B' and B² of the mixing arm upon the dough and insuring a thorough admixture of the ingredients of the dough and the commingling of the air therewith so as to produce a uniform dough of a superior character. So far as I am aware, my invention presents the first instance of a dough mixer that is provided with oppositely inclined members adapted to shift the dough back and forth in the mixing chamber, in combination with a stretching bar extending between the opposite members of the mixing arm.

Having thus described my invention, what I claim as new and desire to secure by Letters Patent is:—

1. In a dough mixer, the combination with an enclosing casing, of a rotatable mixer arm having, upon opposite sides of its axis, thrust members adapted to move the dough back and forth from end to end of the casing, said arm being independently pivoted at each end so as to afford a clear opening within the mixer arm extending across the axis thereof, and a stretcher bar extending across said opening substantially at right angles to said axis and connecting the thrust members at opposite sides of the axis.

2. In a dough mixer, the combination with an enclosing casing, of a rotatable mixer arm comprising a single integral frame pivoted to said casing and having at each side and offset from its axis of rotation and adjacent each end, a quadrilateral member, and a bar connecting said quadrilateral member to the opposite end of the frame, said quadrilateral members being so inclined as to move the dough back and forth from end to end of the casing, and a stretcher bar extending centrally across the axis of rotation of said frame between said quadrilateral members, said frame being unobstructed between its pivotal points and said stretcher bar.

3. In a dough mixer, the combination with an enclosing casing, of a rotatable mixer arm comprising a single integral frame having at opposite sides of its axis end bars adapted to travel in proximity to the end walls of the casing, and each having a plurality of thrust bars extending therefrom toward the opposite end of the casing and so inclined as to move the dough back and forth from end to end of the casing, and a stretcher bar extending at substantially right angles to the axis of rotation of said frame at the center thereof, said frame being unobstructed between said end bars and said stretcher bar.

4. In a dough mixer, the combination with a receptacle of a rotatable mixer arm therein comprising a plurality of correspondingly inclined thrust members at each side of the axis of rotation of the mixer arm and a cross bar connecting the inner terminals of all the thrust members, said thrust members being arranged so that those at one side of the axis of rotation of the mixer arm co-operate to force the material in the receptacle transversely of the stretcher bar into the path of the thrust members at the opposite side of the axis of rotation of the mixer arm.

5. In a dough mixer, the combination with a receptacle of a mixer arm therein comprising a pair of oppositely extending crank members pivoted in axial alignment at the opposite ends respectively of the receptacle, a side rail extending from the outer end of each crank member approximately half way along the side of the receptacle and then turned inwardly to connect with the hub of the other crank member, a cross bar connecting the intermediate portions of the side rails and division members extending at opposite sides of the cross bar to the respective crank member.

GEORGE ROYAN.